United States Patent
McKay et al.

(10) Patent No.: US 12,421,848 B2
(45) Date of Patent: Sep. 23, 2025

(54) POWER AND TELEMETRY SYSTEMS FOR A DOWNHOLE INSTRUMENT

(71) Applicant: Expro North Sea Limited, Dyce (GB)

(72) Inventors: John Henry McKay, Stonehaven (GB); David Sirda Shanks, Newmachar (GB)

(73) Assignee: Expro North Sea Limited, Dyce (GB)

( * ) Notice: Subject to any disclaimer, the term of this patent is extended or adjusted under 35 U.S.C. 154(b) by 879 days.

(21) Appl. No.: 17/621,489

(22) PCT Filed: Jun. 16, 2020

(86) PCT No.: PCT/EP2020/066556
§ 371 (c)(1),
(2) Date: Dec. 21, 2021

(87) PCT Pub. No.: WO2020/254286
PCT Pub. Date: Dec. 24, 2020

(65) Prior Publication Data
US 2022/0397032 A1    Dec. 15, 2022

(30) Foreign Application Priority Data
Jun. 21, 2019  (GB) .................................. 1908929

(51) Int. Cl.
*E21B 47/13*  (2012.01)
*H02J 7/00*  (2006.01)
(52) U.S. Cl.
CPC ............ *E21B 47/13* (2020.05); *H02J 7/0047* (2013.01); *H02J 7/00712* (2020.01)

(58) Field of Classification Search
None
See application file for complete search history.

(56) References Cited

U.S. PATENT DOCUMENTS

| | | | |
|---|---|---|---|
| 10,066,481 B2 * | 9/2018 | Switzer | E21B 47/12 |
| 2008/0294005 A1 * | 11/2008 | Honda | A61B 1/00016 |
| | | | 600/118 |
| 2009/0021393 A1 | 1/2009 | Layton | |
| 2012/0268074 A1 | 10/2012 | Cooley | |
| 2014/0118101 A1 * | 5/2014 | Navarro | H01F 29/025 |
| | | | 29/602.1 |
| 2014/0121973 A1 | 5/2014 | Buchanan | |
| 2014/0299353 A1 * | 10/2014 | Saito | H01B 7/282 |
| | | | 29/868 |
| 2015/0022371 A1 | 1/2015 | Shanks | |

(Continued)

FOREIGN PATENT DOCUMENTS

WO    2013072682 A2    5/2013

*Primary Examiner* — Carlos Garcia
(74) *Attorney, Agent, or Firm* — Getz Balich LLC

(57) ABSTRACT

A downhole instrument system for permitting continued operation a downhole instrument after one or more failure modes is provided. The downhole instrument system includes an electrical power supply in electrical communication with the downhole instrument via an electrical power connection comprising one or more lengths of electrical cable and one or more electrical cable terminations; a load monitor configured to monitor a load on the electrical power supply, wherein the monitored load is dependent on one or more failure modes related to the electrical power connection; and a power controller configured to control the electrical power supplied to the downhole instrument based on the monitored load.

13 Claims, 9 Drawing Sheets

(56) References Cited

U.S. PATENT DOCUMENTS

| | | | |
|---|---|---|---|
| 2015/0052743 A1* | 2/2015 | Kawabata | H01L 21/561 29/829 |
| 2016/0245042 A1* | 8/2016 | Napier | E21B 34/101 |
| 2017/0002640 A1 | 1/2017 | Hoefel | |
| 2017/0241259 A1* | 8/2017 | White | E21B 17/10 |
| 2017/0331280 A1 | 11/2017 | Koenecke | |
| 2019/0048690 A1 | 2/2019 | Rajagopalan | |

* cited by examiner

POWER AND TELEMETRY SYSTEMS FOR A DOWNHOLE INSTRUMENT

This application claims priority to PCT Patent Appln. No. PCT/EP2020/066556 filed Jun. 16, 2020, which claims priority GB Patent Appln. No. 1908929.1 filed Jun. 21, 2019, which are herein incorporated by reference.

BACKGROUND OF THE INVENTION

1. Technical Field

The subject application relates generally to downhole systems, and in particular to a downhole instrument system comprising a power system, an electrical cable termination and a telemetry system. The subject application further relates to a power system for a downhole instrument, an electrical cable termination, and a telemetry system for a downhole instrument.

2. Background Information

In downhole operations, downhole instruments are connected to a power system and a telemetry system via an electrical connection, typically comprising one or more of an encapsulated cable or tubing encased cable (TEC). The power system may comprise an electrical power supply, which may be located at the surface and be configured to supply electrical power to the downhole instrument(s) via the cable or TEC. The telemetry system may comprise a transmitter, which may be located at the downhole instrument, a data transmission medium, which may comprise at least part of the electrical connection, and a receiver, which may also be located at the surface and receive one or more data signals from the transmitter via the cable or TEC. For example, to monitor bottomhole conditions, one or more sensors are fitted to production tubing, and connected to a power system and a telemetry system at the surface via a single conductor TEC. A power signal is transferred from the power system to the sensors via the single conductor TEC. Data from the sensors is transmitted to the receiver via the data transmission medium, the single conductor TEC. The power and telemetry systems may therefore be affected by any problems with the single conductor TEC.

The downhole operating environment of a downhole instrument is harsh. For example, the integrity of electrical cables and/or electrical cable terminations may compromised, for example due to damage, erosion, corrosion or wear. This may permit fluid ingress into cables and/or cable terminations associated with the downhole instrument, which in turn may cause physical damage to the downhole instrument and electrical malfunction of the downhole instrument as well the transmission of unrecoverable signals transmitted from the downhole instrument.

It is desirable to mitigate or solve one or more of the problems identified above.

SUMMARY OF THE INVENTION

It should be appreciated that this Summary is provided to introduce a selection of concepts in a simplified form that are further described below in the Detailed Description. This Summary is not intended to be used to limit the scope of the claimed subject matter.

The inventors have appreciated that current systems seek to prevent damage and/or fluid ingress to the downhole instrument system, but that a novel approach is to allow operation of the downhole instrument system in the face of such damage and/or fluid ingress. It is therefore an object to provide a downhole instrument system that permits continued operation of the downhole instrument and recovery of data from the downhole instrument after fluid ingress and/or a plurality of other failure modes.

Accordingly, in an aspect there may be provided a downhole instrument system for permitting continued operation a downhole instrument after one or more failure modes.

In one aspect, the downhole instrument system comprises: an electrical power supply in electrical communication with the downhole instrument via an electrical power connection comprising one or more lengths of electrical cable and one or more electrical cable terminations; a load monitor configured to monitor a load on the electrical power supply, wherein the monitored load is dependent on one or more failure modes related to the electrical power connection; and a power controller configured to control the electrical power supplied to the downhole instrument based on the monitored load.

In some examples, the one or more failure modes comprise fluid ingress to the one or more lengths of electrical cable and/or the one or more electrical cable terminations, such that a path to ground is established via the fluid. In some examples, the fluid comprises salt water.

In some examples, the electrical power supply is configured to supply direct current (DC) and/or alternating current (AC).

In some examples, the load monitor and/or the power controller comprises one or more of a voltage regulator and a constant current regulator. In some examples, the voltage regulator and/or the constant current regulator comprise a plurality of passive electronic components configured to provide a constant voltage and/or a constant current for a plurality of loads.

In some examples, the load monitor is configured to determine a total load on the electrical power supply and to determine a proportion of the total load that is related to the one or more failure modes. In some examples, the load monitor is configured to determine the proportion of the total load based on data relating to one or more of a voltage and a current drawn by the downhole instrument. In some examples, the load monitor further comprises a receiver configured to receive from the downhole instrument the data relating to one or more of a voltage and a current drawn by the downhole instrument.

In some examples, the one or more lengths of electrical cable comprise a steel encapsulated cable and/or a tubing encased cable.

In some examples, the one or more electrical cable terminations comprise: a casing, at least part of which is arranged to be held at ground potential during use; and first and second exposed electrical conductors housed within the casing, wherein the first exposed electrical conductor is configured to pass electrical power from the one or more lengths of electrical cable to the second exposed electrical conductor when the first and second exposed electrical conductors are in electrical communication. In some examples, at least part of the casing comprises an electrically insulating coating for preventing, in the event that fluid that has ingressed the electrical cable termination, the fluid from contacting an area of the casing held at ground potential. In some examples, the electrical cable termination comprises a chamber, in which the first and second exposed electrical conductors are positioned during use, and wherein an inner wall of the chamber is at least partially formed by the at least part of the casing held at ground potential during use, and wherein at least part of the inner wall of the chamber comprises an electrically insulating coating.

In some examples, the downhole instrument system further comprises: a telemetry system for transmitting data from the downhole instrument, the telemetry system comprising: a transmitter configured to transmit sensor data relating to a downhole parameter towards a surface apparatus; a data transmission medium configured to propagate the transmitted sensor data and comprising one or more lengths of electrical cable and one or more electrical cable terminations; and a receiver configured to receive the transmitted sensor data, wherein one or both of the receiver and the transmitter is configured to control a telemetry parameter relating to receipt and/or transmission of the sensor data based on data indicating a load on the data transmission medium that is dependent on the one or more failure modes related to the data transmission medium.

In some examples, the data transmission medium comprises at least part of the electrical power connection.

In some examples, the downhole instrument system further comprises: a load monitor configured to monitor a load on the data transmission medium. In some examples, the load monitor is further configured to determine the load on the data transmission medium. In some examples, the load monitor comprises one or more of a voltage regulator and a constant current regulator. In some examples, the voltage regulator and/or the constant current regulator comprise a plurality of passive electronic components configured to provide a constant voltage and/or a constant current for a plurality of loads. In some examples, the load monitor is configured to determine a total load of the data transmission medium and to determine a proportion of the total load that is related to the one or more failure modes. In some examples, the load monitor is configured to determine the proportion of the total load based on data relating to one or more of a voltage and a current drawn by the downhole instrument. In some examples, the load monitor further comprising a receiver configured to receive from the downhole instrument the data relating to one or more of a voltage and a current drawn by the downhole instrument.

In some examples, controlling the telemetry parameter comprises the transmitter controlling one or more of: a transmission power of the transmitted sensor data; a number of times the sensor data is transmitted; a modulation scheme of the transmitted sensor data; and a data transmission rate of the transmitted sensor data.

In some examples, controlling the telemetry parameter comprises the receiver controlling one or more of: an amplification of the received sensor data; a determination of the sensor data based on a plurality of received transmissions of the sensor data; selection of the sensor data in a received signal based on frequency analysis; filtering of the received signal prior to selection of the sensor data; and a demodulation scheme of the received sensor data. In some examples, the receiver is configured to use automatic gain control to adjust the amplification.

Accordingly, in another aspect, there may be provided a power system for use in a downhole instrument system and for supplying electrical power to a downhole instrument.

The power system may comprise: an electrical power supply; an electrical power connection comprising one or more lengths of electrical cable and one or more electrical cable terminations, wherein the electrical power supply is for electrical communication with the downhole instrument via the electrical power connection; a load monitor configured to monitor a load on the electrical power supply, wherein the monitored load is dependent on one or more failure modes related to the electrical power connection; and a power controller configured to control the electrical power supplied to the downhole instrument based on the monitored load.

Accordingly, in another aspect, there may be provided a method for operation of a power system for use in a downhole instrument system and for supplying electrical power to a downhole instrument.

The method may comprise: monitoring, by a load monitor, a load on an electrical power supply, wherein the monitored load is dependent on one or more failure modes related to an electrical power connection, wherein the electrical power supply is for electrical communication with the downhole instrument via the electrical power connection; and controlling, by a power controller, the electrical power supplied to the downhole instrument based on the monitored load.

Accordingly, in another aspect, there may be provided a non-transitory computer readable medium having computer readable code stored thereon, the computer readable code when executed by a processor configured to perform the method.

Accordingly, in another aspect, there may be provided a telemetry system for use in a downhole instrument system and for transmitting data from a downhole instrument to a receiver.

The telemetry system may comprise: a transmitter configured to transmit sensor data relating to a downhole parameter towards a surface apparatus; a data transmission medium comprising one or more lengths of electrical cable and one or more electrical cable terminations configured to propagate the transmitted sensor data; and a receiver configured to receive the transmitted sensor data, wherein one or both of the receiver and the transmitter is configured to control a telemetry parameter relating to receipt and/or transmission of the sensor data based on a load on the transmission medium that is dependent on one or more failure modes related to the one or more lengths of electrical cable and the one or more electrical cable terminations.

Accordingly, in another aspect, there may be provided a method for operating a telemetry system for use in a downhole instrument system and for transmitting data from a downhole instrument to a receiver.

The method may comprise: transmitting, by a transmitter, sensor data relating to a downhole parameter towards a surface apparatus, wherein the sensor data is propagated by a data transmission medium comprising one or more lengths of electrical cable and one or more electrical cable terminations; and receiving, by a receiver, the transmitted sensor data, wherein one or both of the receiver and the transmitter controls a telemetry parameter relating to receipt and/or transmission of the sensor data based on a load on the transmission medium that is dependent on one or more failure modes related to the one or more lengths of electrical cable and the one or more electrical cable terminations.

Accordingly, in another aspect, there may be provided a non-transitory computer readable medium having computer readable code stored thereon, the computer readable code when executed by a processor configured to perform the method.

Accordingly, in another aspect, there may be provided an electrical cable termination for use in a downhole instrument system.

The electrical cable termination may comprise: a casing, at least part of which is arranged to be held at ground potential during use; and first and second exposed electrical conductors housed within the casing, wherein the first exposed electrical connector is configured to pass electrical power from the one or more lengths of electrical cable to the second exposed electrical connector when the first and second exposed electrical connectors are in electrical communication, and wherein at least part of the casing comprises an electrically insulating coating for preventing, in the event that fluid that has ingressed the electrical cable termination, the fluid from contacting an area of the casing held at ground potential.

In some examples, the electrical cable termination comprises a chamber, in which the first and second exposed electrical connectors are positioned during use, and wherein an inner wall of the chamber is at least partially formed by the at least part of the casing arranged to be held at ground potential during use, and wherein at least part of the inner wall of the chamber comprises an electrically insulating coating.

The above summary is intended to be merely exemplary and non-limiting.

DETAILED DESCRIPTION OF THE INVENTION

Figure 1:
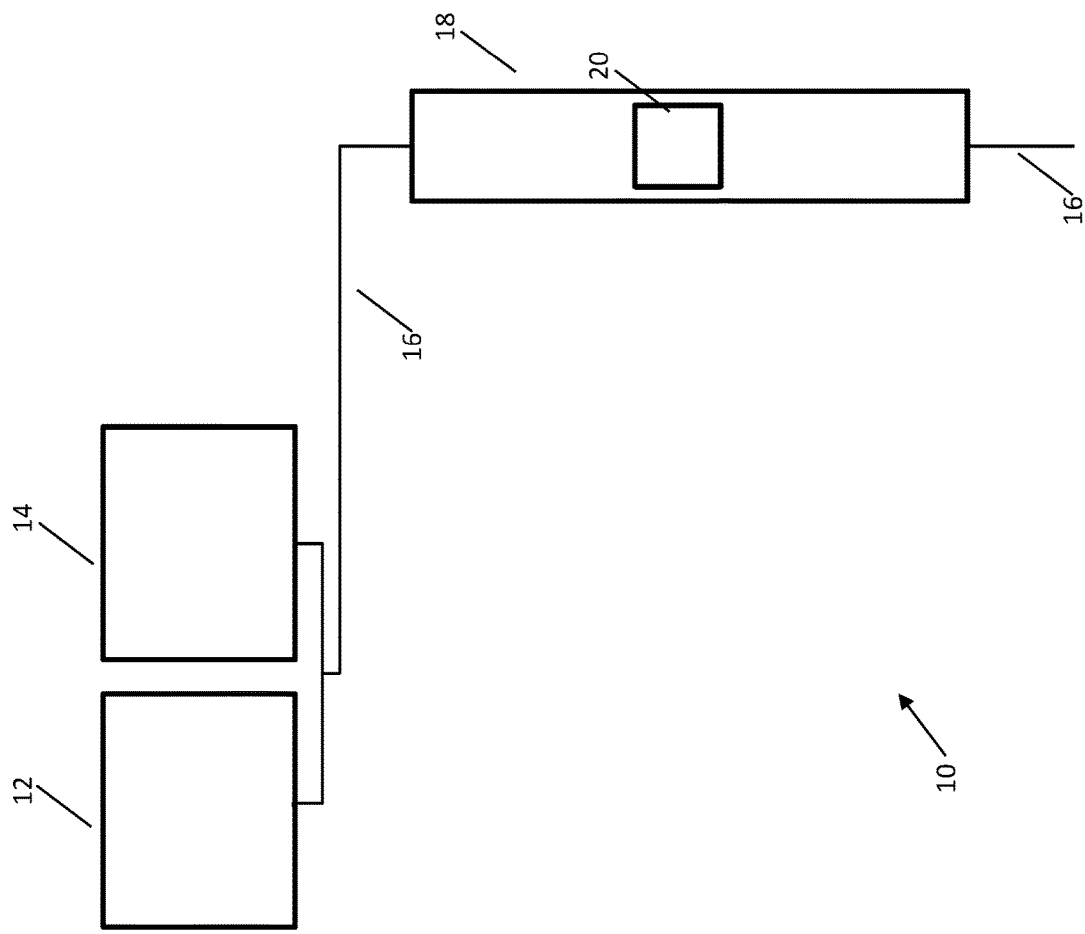
FIG. 1 is a block diagram of a downhole instrument system in accordance with an aspect of the description.

The foregoing summary, as well as the following detailed description of certain embodiments will be better understood when read in conjunction with the accompanying drawings. As will be appreciated, like reference characters are used to refer to like elements throughout the description and drawings. As used herein, an element or feature recited in the singular and preceded by the word "a" or "an" should be understood as not necessarily excluding a plural of the elements or features. Further, references to "one example" or "one embodiment" are not intended to be interpreted as excluding the existence of additional examples or embodiments that also incorporate the recited elements or features of that one example or one embodiment. Moreover, unless explicitly stated to the contrary, examples or embodiments "comprising", "having" or "including" an element or feature or a plurality of elements or features having a particular property might further include additional elements or features not having that particular property. Also, it will be appreciated that the terms "comprises", "has" and "includes" mean "including but not limited to" and the terms "comprising", "having" and "including" have equivalent meanings.

As used herein, the term "and/or" can include any and all combinations of one or more of the associated listed elements or features.

It will be understood that when an element or feature is referred to as being "on", "attached" to, "connected" to, "coupled" with, "contacting", etc. another element or feature, that element or feature can be directly on, attached to, connected to, coupled with or contacting the other element or feature or intervening elements may also be present. In contrast, when an element or feature is referred to as being, for example, "directly on", "directly attached" to, "directly connected" to, "directly coupled" with or "directly contacting" another element of feature, there are no intervening elements or features present.

It will be understood that spatially relative terms, such as "under", "below", "lower", "over", "above", "upper", "front", "back" and the like, may be used herein for ease of describing the relationship of an element or feature to another element or feature as depicted in the figures. The spatially relative terms can however, encompass different orientations in use or operation in addition to the orientation depicted in the figures.

Reference herein to "example" means that one or more feature, structure, element, component, characteristic and/or operational step described in connection with the example is included in at least one embodiment and or implementation of the subject matter according to the present disclosure. Thus, the phrases "an example," "another example," and similar language throughout the present disclosure may, but do not necessarily, refer to the same example. Further, the subject matter characterizing any one example may, but does not necessarily, include the subject matter characterizing any other example.

Reference herein to "configured" denotes an actual state of configuration that fundamentally ties the element or feature to the physical characteristics of the element or feature preceding the phrase "configured to".

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

As used herein, the terms "approximately" and "about" represent an amount close to the stated amount that still performs the desired function or achieves the desired result. For example, the terms "approximately" and "about" may refer to an amount that is within less than 10% of, within less than 5% of, within less than 1% of, within less than 0.1% of, or within less than 0.01% of the stated amount.

Turning now to FIG. 1, a block diagram of a downhole instrument system is shown and generally identified by reference numeral 10. The downhole instrument system 10 is configured for use in downhole environments. The downhole instrument system 10 comprises a power system 12, a telemetry system 14, a cable 16, a cable termination 18 and a downhole instrument 20. In the example of FIG. 1, the downhole instrument 20 is configured to be daisy-chained and so cables 16 and cable terminations 18 may be at each end. While the telemetry system 14 has been shown adjacent and connected to the power system 12, the telemetry system 14 comprises components such as a receiver which may be on the surface with components of the power system 12, and a transmitter which may be downhole along with components of the cable termination 18 and downhole instrument 20.

Figure 2:
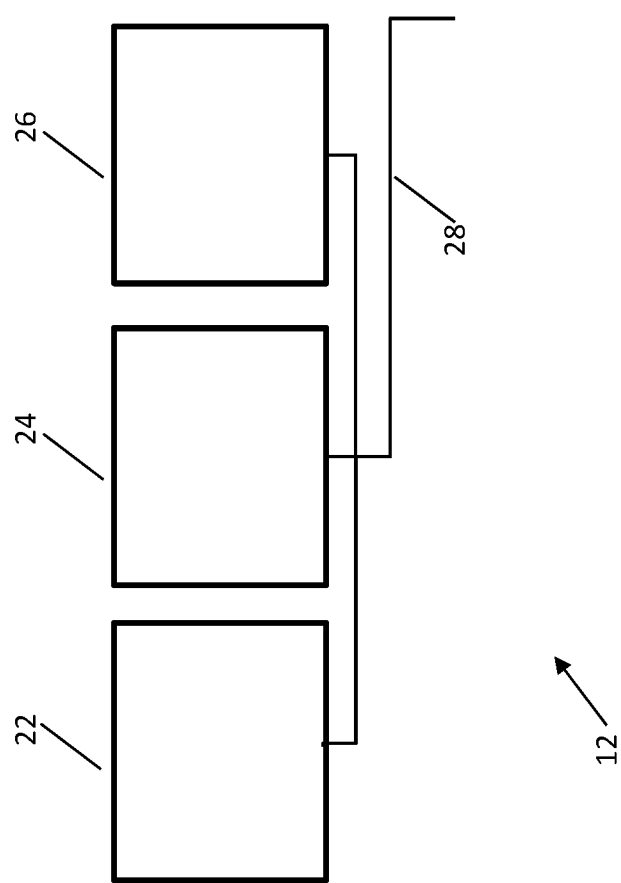
FIG. 2 is a block diagram of a power system of the downhole instrument system of FIG. 1.
Figure 3:
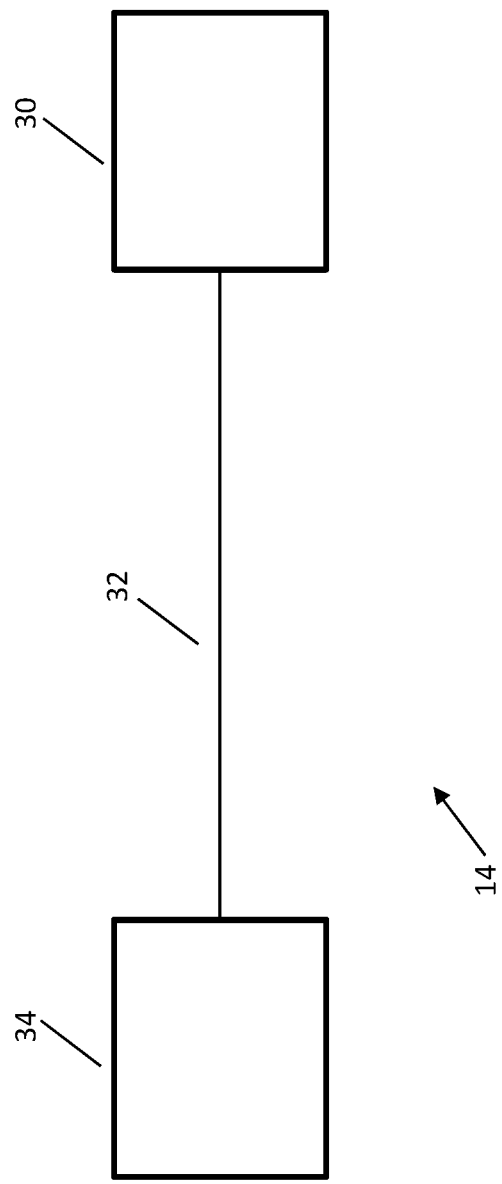
FIG. 3 is a block diagram of a telemetry system of the downhole instrument system of FIG. 1.

Turning now to FIG. 2, a block diagram of the power system 12 is shown. The power system 12 comprises an electrical power supply 22, a load monitor 24, a power controller 26 and an electrical power connection 28. The power system, and specifically, the power controller, is configured to supply electrical power to the downhole instrument 20 via the electrical power connection 28 formed, at least partly, by the cable 16 and the cable termination 18. In this embodiment, the power is direct current (DC). In some exemplary arrangements, the downhole instrument 20 draws a constant current. The power controller 26 is configured to control power to the downhole instrument 20 based on load changes, which may be detected by the load monitor 24 and may be caused by fluid ingress as will be described. The power system 12 supplies power to the downhole instrument 20 at the cable termination 18 via the cable 16. In this embodiment, the power system 12 is at the surface and the electrical power connection 28 extends downhole to the downhole instrument 16. While the electrical power supply 22, load monitor 24 and power controller 26 have been shown as separate functional blocks, the physical components manifesting these functions may be integrated into one or more combined components. For example, the electrical power supply 22 may be include an internal controller thereby not requiring an external separate power controller 26. Furthermore, the load monitor 24 may be integrated into the electrical power supply 22 rather than being a separate external component.

While a particular power system 12 has been described, one of skill in the art will appreciate that other configurations are possible. In another embodiment, the power supplied by the power system 12 to the downhole instrument 20 is alternating current (AC). In this embodiment, the power has a frequency between 20 and 2000 HZ.

The telemetry system 14 comprises a transmitter 30, a data transmission medium 32 and a receiver 34. In exemplary arrangements the transmitter 30 is located at the downhole instrument 16, although it will be appreciated that the transmitter 30 may be a repeater that is located elsewhere downhole. The data transmission medium 32 comprises one or more lengths of electrical cable and one or more cable terminations 14. In some exemplary arrangements, the data transmission medium 32 may comprise at least part of the electrical power connection 28. The receiver 34 may be located at the surface, although in some arrangements the receiver 34 may be located at a repeater configured to retransmit the received signal, typically towards the surface. Both the transmitter 30 and receiver 34 may, in some examples, be transceivers. The telemetry system 14 is configured to transmit, at least partly, data from the downhole instrument 16 via the cable 16 to the receiver 34. The transmitter 30 and/or the receiver 34 is configured to control one or more telemetry parameters based on the load on the data transmission medium 32. The telemetry parameters may control the method used in transmission and/or decoding of transmitted data. The load may be monitored by a load monitor (e.g. the load monitor 24 of the power system 12 or a separate load monitor) and may vary based on one or more failure modes related to the data transmission medium 32, such as fluid ingress.

The cable 16 is configured to transfer power from the electrical power supply 22 to the downhole instrument 20. The cable 16 may be further configured to transfer data from the downhole instrument 16 to the receiver 34 of the telemetry system 14. The cable 16 may be steel encapsulated cable or tubing encased cable (TEC). The cable 16 is configured for use in downhole environments such as production wells, injection wells and abandoned wells. It is noted that the term "cable" encompasses a single conductor, a plurality of conductors or any other means for transference of data and/or electrical power. For example, a cable, when relating to data transfer may be an optical fibre.

While a single cable 16 has been described, one of skill in the art will appreciate that multiple cables may be used including one cable for power transfer from the power system 12 to the downhole instrument 20 and a separate distinct cable for data transfer from the downhole instrument 20 to the telemetry system 14.

The cable termination 18 is configured to enclose the cable 16 in order to make the connection with the downhole instrument 20. The cable termination 18 includes a number of seals as will be described. The cable termination 18 is generally cylindrical.

The downhole instrument 20 receives power from the electrical power supply 22 via the cable 16. The downhole instrument 20 is an electronic device. The downhole instrument 20 comprises the transmitter 30 configured to transmit data to the receiver 34 of the telemetry system 14. The cable termination 18 may be damaged and may therefore be prone to fluid ingress. This may cause the downhole instrument 20 to fail and/or transmit incorrect or unrecoverable data as will be described. The downhole instrument 20 may be a permanent downhole gauge (PDG). Exemplary PDGs comprise one of more sensors that collect information on pressure, temperature, distributive temperature, noise, strain, flow and combinations thereof.

Figure 4:
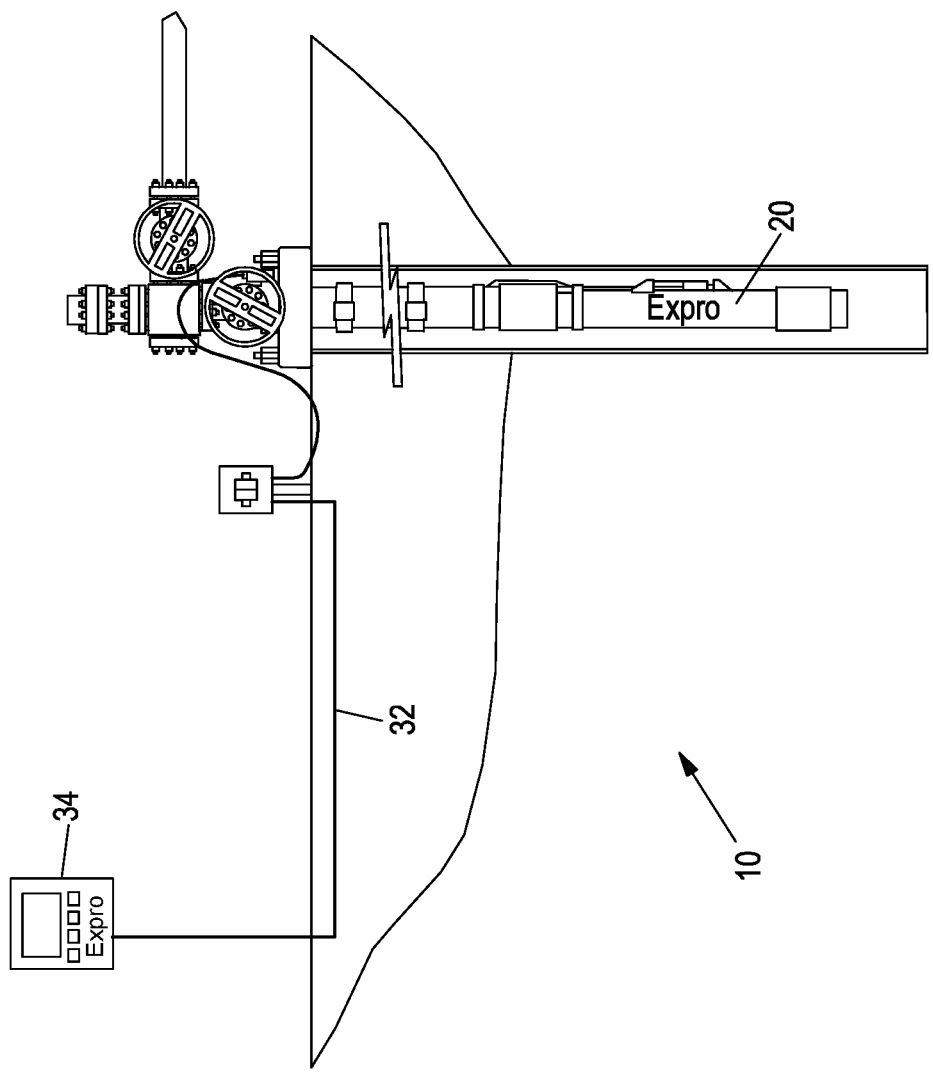
FIG. 4 is an exemplary arrangement of a portion of the downhole instrument system of FIG. 5 is a partial elevation view of a cable and cable termination of the downhole instrument system of FIG. 1.

Turning now to FIG. 4, an exemplary arrangement of a portion the downhole instrument system 10 is shown. As shown in FIG. 4, the receiver 34 receives data from the downhole instrument 20 via the data transmission medium 32. In this exemplary arrangement, the receiver 34 further comprises an interface and data logger. The data transmission medium 32 is connected to the transmitter 30 at the downhole instrument 20 via a cable termination.

Figure 5:
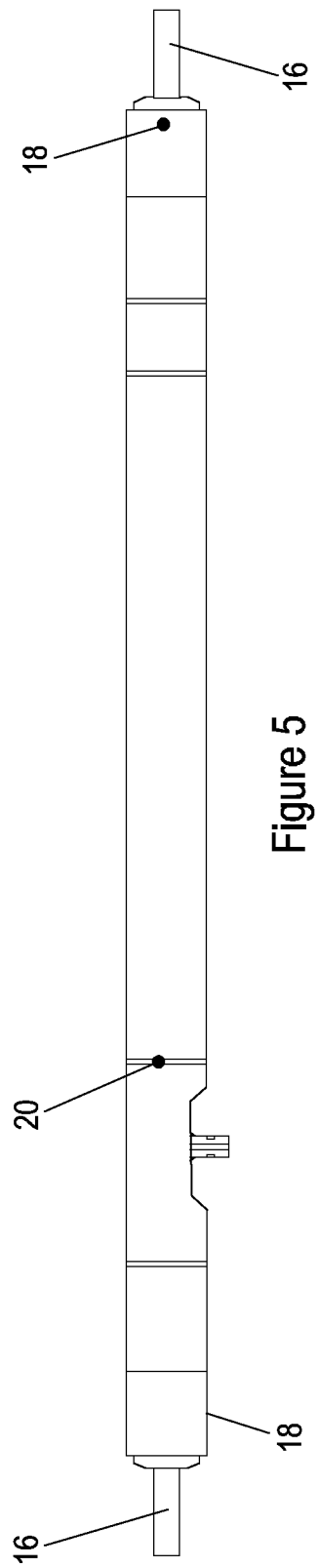
Figure 6:
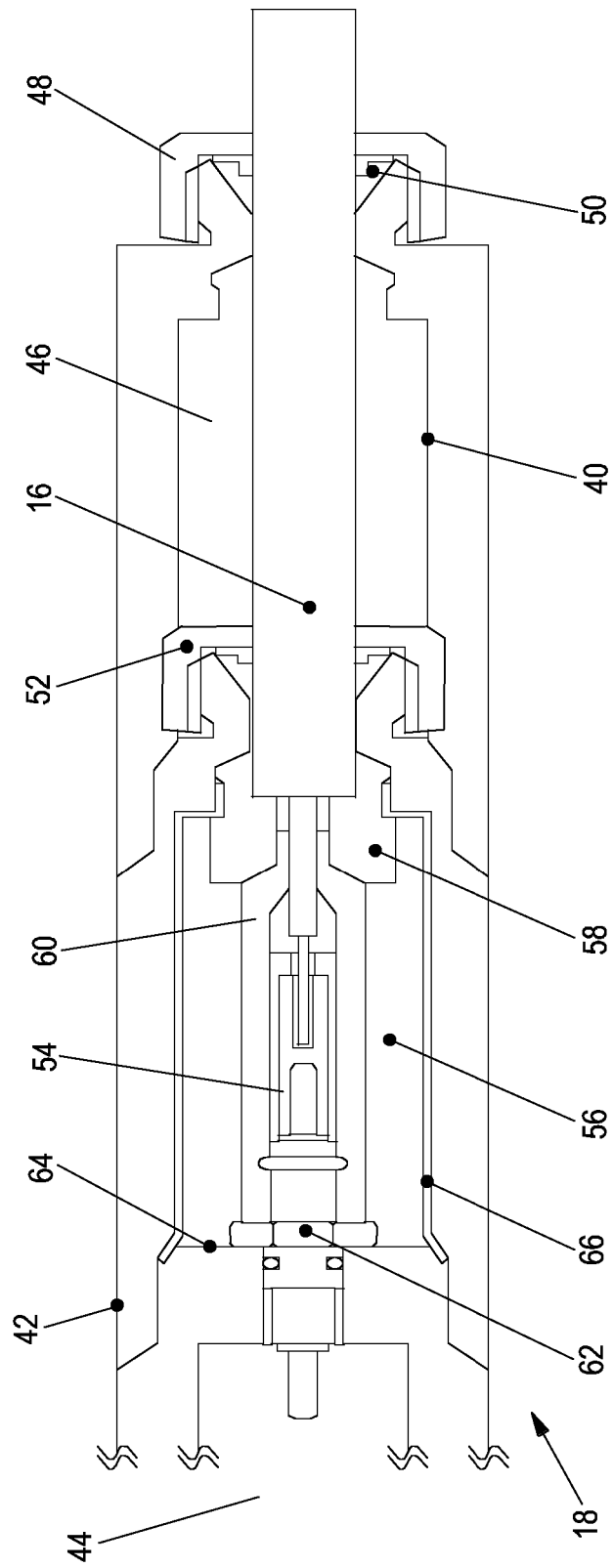
FIG. 6 is a partial cross-sectional view of the cable termination and the cable of the downhole instrument system of FIG. 1.

Turning now to FIG. 5, a partial elevation view of the cable 16, cable termination 18 and downhole instrument 20 is shown. In FIG. 6, a partial cross-sectional view of a lower portion of the cable termination 18 and cable 16 is shown. As shown in FIG. 6, the cable 16 enters the cable termination 18 through an outer pressure housing 40 in the cable termination 18. The cable termination 18 comprises a casing, which in the example of FIG. 6 further comprises the outer pressure housing 40, an instrument housing 42. FIG. 2 also shows part of further downhole instrument internals 44 indicated as extending beyond the figure by hatched lines. The casing may comprise fewer components, for example just the instrument housing 42 and the downhole instrument internals 44. The outer pressure housing 40, instrument housing 42 and internals 44 are generally cylindrical elongate members. The outer pressure housing 40 and the instrument housing 42 are fitted together. The instrument housing 42 and the internals 44 are fitted together.

The outer pressure housing 40 comprises an outer wall and a cable internal chamber 46. The cable internal chamber 46 is defined by the outer wall of the outer pressure housing 40. The cable 16 enters the cable internal chamber 46 via a central aperture in the outer wall. The outer pressure housing 40 further comprises an end cap 48, an external cable seal 50 and an internal cable seal 52. The end cap 48 is configured to hold the external cable seal 50 in place. The end cap 48 is further configured to energize the external cable seal 50. The end cap 48 is generally cylindrical. The external cable seal 50 is configured to seal the interface between the central aperture and the cable 16 to prevent leakage of production fluid, water, salt water, brine, etc. into the cable internal chamber 46 of the outer pressure housing 40. The external cable seal 50 is generally cylindrical. In this embodiment, the external cable seal 50 is metal.

The cable 16 passes through the central aperture and into the cable internal chamber 46 of the outer pressure housing 40. The cable 16 spans the cable internal chamber 46 to the instrument housing 42. The cable 16 is electrically connected to the downhole instrument 20 in the instrument housing 42 via a conductor 54 of a connector. The internal cable seal 52 is configured to seal the interface between an internal instrument chamber 56 and the cable 16.

As previously stated, the outer pressure housing 40 and the instrument housing 42 are fitted together. The instrument housing 42 comprises an outer wall and the internal instrument chamber 56. The internal instrument chamber 56 is defined, at least partially, by the outer wall of the instrument housing 42. The cable 16 enters the internal instrument chamber 56 via the cable internal chamber 46. The instrument housing 42 further comprises an instrument seal 58, a boot 60, and a pressure feedthrough and connector 62.

The instrument seal 58 is configured to seal the interface between the internal instrument chamber 56 and the cable 16. The instrument seal 58 is generally cylindrical. In this embodiment, the internal cable seal 52 is metal. The boot 60 is configured to protect a pin connection between the cable 16 and the downhole instrument 20 from damage. The boot 60 is further configured to prevent fluid from contacting the pin connection between the cable 16 and the downhole instrument 20. The boot 60 is generally cylindrical. In this embodiment, the boot 60 is an elastomer. The connector 62 connects the downhole instrument 20 and the downhole instrument internals 44. In this embodiment, the connector 62 is a glass to metal electrical feedthrough connection. The connector 62 is rated for high pressure.

In this embodiment, the downhole instrument 20 further comprises electrical insulation. The insulation is configured to prevent fluid that has ingressed the cable termination from making an electrical connection between the pin connection and the casing. For example, the electrical insulation may be applied to an inner wall of the internal instrument chamber 56 to prevent fluid from contacting the inner wall. In this embodiment, the electrical insulation takes the form of an insulating coating or lining. The insulating lining takes the form of insulation 64 on the inner surface of the internal instrument chamber 56, which in this example is partially formed by a wall of the downhole instrument internals 44, and insulation 66 on the inner surface of the internal instrument chamber 56, which in this example is partially formed by a wall of the instrument housing 42 as will be described.

The cable 16, cable termination 18 and downhole instrument 20 may be welded together. The cable 16, cable termination 18 and downhole instrument 20 may be pressure tested before deployment.

As one of skill in the art will appreciate, the cable 16 and cable termination 18 may be daisy chained with multiple cables and cable terminations as needed.

During operation of the downhole instrument system 10, the cable termination 18 may be subject to harsh conditions. In such harsh conditions, fluid such as water, salt water and brine may be present. As previously stated, the cable termination 18 may be damaged resulting in fluid ingress causing the downhole instrument 20 to fail and/or transmit incorrect or unrecoverable data. Specifically, the operating environment of the cable termination 18 may result in fluid leaking through the external cable seal 50, the internal cable seal 52 and the instrument seal 58 and entering the internal instrument chamber 56. If the boot 60 fails (e.g. from age or degradation), the liquid may create a resistive short between the live conductor 54 that provides power to the downhole instrument 20, and any other conducting elements via exposed metal. In specific cases, the resistive short is between the live conductor 54 and the casing of the cable termination 18, which may be held at ground potential during use. It is noted that the term "ground potential" may encompass any potential that is substantially constant and offset from the operating voltage of the downhole instrument 20.

This resistive short adds a load to the power system of the downhole instrument system 10. The inventors have realised that the additional load is proportional to the surface area of the exposed metal. The greater the surface exposed metal on either of the live conductor 54 and the casing, the lower the resistance. The inventors have also realised that the additional load is further proportional to the distance between the conductor 54 or other conducting elements and the casing. The greater the distance, the greater the resistance. The additional load draws current away from the downhole instrument 20. The drawn current may also increase the voltage drop from the power system 12 to the downhole instrument 20. The drawn current and the increased voltage drop may cause the downhole instrument 20 to no longer function correctly. The downhole instrument 20 may not have sufficient current and voltage to function. Furthermore, the downhole instrument 20 may collect and transmit incorrect information due to insufficient current and voltage being supplied from the power system 12 due to the additional unforeseen resistive load. In exemplary arrangements in which the data transmission medium 32 comprises at least part of the electrical power connection 28, any data transmitted by the transmitter 30 of the telemetry system 14 may be corrupted and/or attenuated due to the additional load on the data transmission medium 32, e.g. caused by the fluid ingress. It is noted that such failure may also occur in arrangements in which the data transmission medium 32 and the electrical power connection 28 are separate. The downhole instrument 20 may consequently be taken out of service.

Accordingly, the power system 12 of the subject application is configured to adjust power to the downhole instrument 20 based on load changes caused by fluid ingress. In exemplary arrangements, this is provided by the load monitor 24 monitoring the load on the electrical power connection 28 and the power controller 26 controlling the power based on the monitored load. Adjusting the power to the downhole instrument 20 ensures the downhole instrument 20 may continue operation despite one or more failure modes, such as fluid ingress. Therefore, the downhole instrument 20 does not cease to function as a result of fluid ingress and the resulting load.

The resistive short increases signal attenuation of data transferred from the downhole instrument 20 via the telemetry system 14. The amplitude decrease from the increased signal attenuation may result in unrecoverable data at the receiver 14. Accordingly, the telemetry system 14 is configured to recover data from the downhole instrument 20 after fluid ingress. The telemetry system 14 is configured to compensate for the increased signal attenuation caused by fluid ingress. In exemplary arrangements, this is provided by the transmitter 30 and/or receiver 34 of the telemetry system 14 controlling one or more telemetry parameters relating to transmission and/or reception of sensor data based on data indicating the load on the data transmission medium 32. The data indicating the load may be received from another device, e.g. the load monitor 24 of the power system 12, or may be determined by a further load monitor in the telemetry system 14. In one embodiment, the receiver 34 comprises a surface data recovery module configured to recover data from the downhole instrument 20 after fluid ingress.

Figure 7:
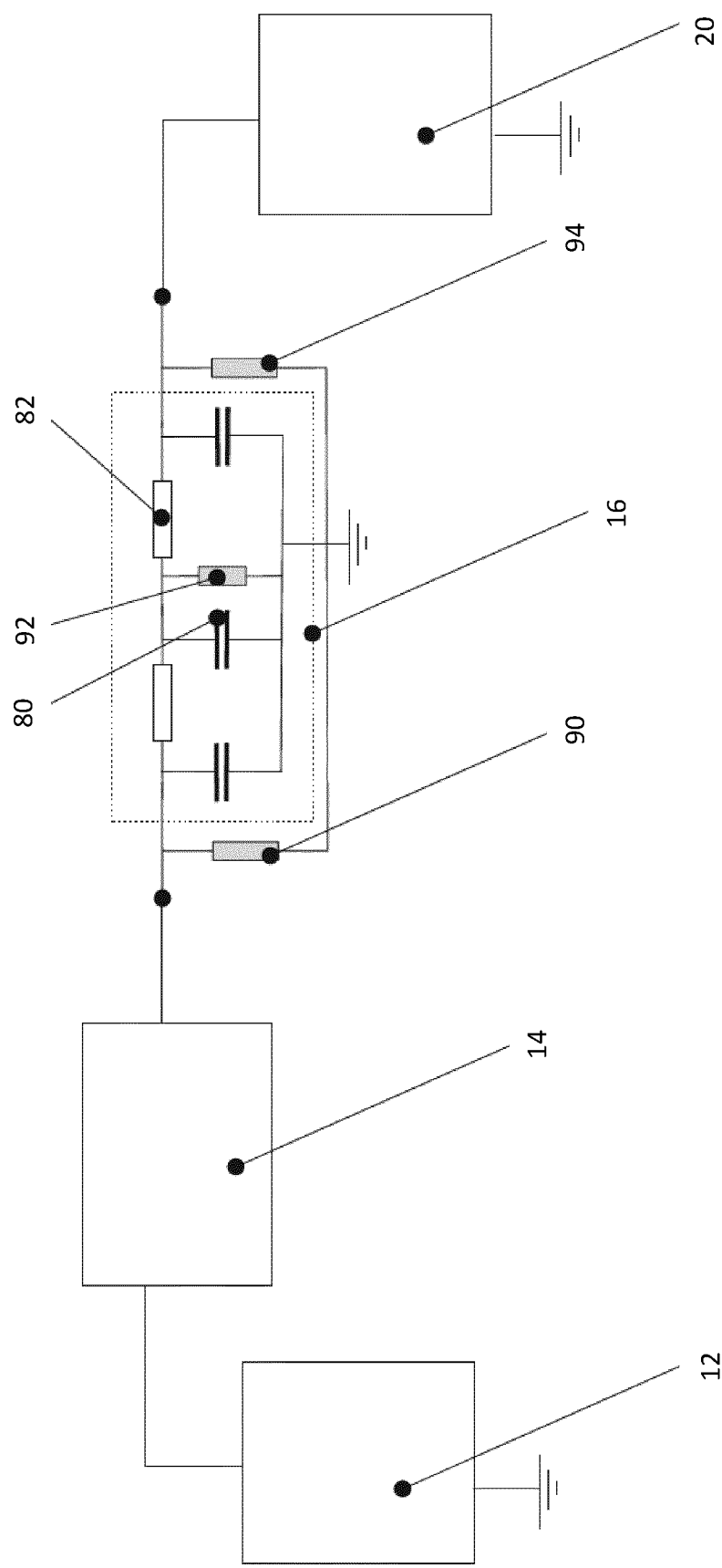
FIG. 7 is a block diagram of the downhole instrument system of FIG. 1.

Turning now to FIG. 7, a block diagram of the downhole system 10 is shown 4. The circuit schematic 70 is functional block diagram for a downhole instrument system 10. The block diagram 70 comprises the power system 12, the telemetry system 14, the cable 16 and the downhole instrument 20.

As previously stated, the power system 12 is configured to supply power to the downhole instrument 20 via the cable 16. The telemetry system 14 is configured to receive data from the downhole instrument 20 via the cable 16.

The cable 16 is an active load on the power system 12. The cable 16 is represented as parallel capacitors 80 to ground and series resistors 82. The downhole instrument 20 is an active load on the power system 12.

When fluid ingress occurs, the load changes. The power system 12 sees the load changes as changes in the resistance. Depending on the location of the fluid ingress, the change in resistance may occur at different locations in the downhole instrument system 10 and is therefore represented at different locations in the block diagram.

If the fluid ingress occurs prior to the cable 16, the change in resistance is represented as an additional pre-cable resistance 90. This change may be at the surface where the cable 16 is connected to the power system 12. In this embodiment, the fluid ingress may be at a wellhead to which the cable 16 is connected. The fluid ingress may further be at wellhead feedthrough connectors.

If the fluid ingress occurs at the cable 16, the change in resistance is represented as an additional cable resistance 92. In this embodiment, the fluid ingress may be at packer feedthrough in the cable 16.

If the fluid ingress occurs at the cable termination 18, the change in resistance is represented as an additional cable termination resistance 94. In this embodiment, the fluid ingress may be at the downhole instrument 20 as previously described.

When fluid ingress occurs, the load monitor 24 of the power system 12 sees a load change. The load change is effectively caused by a change in resistance to ground. In this embodiment, the load change is a resistance change. In this embodiment, the resistance change is a new path to ground through a resistance represented by the pre-cable resistance 90, cable resistance 92 and/or cable termination resistance 94. The new path to ground causes additional current to be drawn from the power system 12 away from the downhole instrument 20. Furthermore, the new path to ground may cause an increased voltage drop prior to reaching the downhole instrument 20. Thus, the downhole instrument 20 does not function correctly due to insufficient current and/or voltage.

To compensate for the load change as monitored by the load monitor 24, the power controller 26 of the power system 12 is configured to control power to the downhole instrument 20. Specifically, the power system 12 is further configured to increase the current and/or voltage to provide sufficient current to power the downhole instrument 20. The power system 12 is configured to increase the voltage supplied to compensate for the increased voltage drop.

In exemplary arrangements, the load monitor 24 and/or the power controller 26 may comprise a voltage and/or current regulator. In some specific arrangements, the load monitor 24 and the power controller 26 may be embodied in a voltage and/or current regulator. The voltage and/or current regulator may comprise a plurality of passive electronic components and, in some cases, no digital processing elements, such as processors. Using the voltage and/or current regulator, a change in load may be accommodated.

In other arrangements, the load monitor 24 and/or the power controller 26 may be embodied in one or more computer processors. The computer processor(s) may be configured, acting as a load monitor, to detect a load change caused by a failure mode of the downhole instrument system, e.g. fluid ingress. The change in load may be detected based on a change in the voltage and or current drawn by the downhole instrument system 10 and may be indicative of the failure. The load monitor 24 may be configured to determine what proportion of the detected load is attributable to the failure. In this way, the load monitor 24 may be able to determine the proportion of the voltage or current supplied to the downhole instrument system 10 that is attributable to the failure. The load monitor 24 may therefore be configured to determine the change in current and/or voltage that is required to compensate for the failure.

In yet other arrangements, the load monitor 24 may be configured to receive electrical power data from a transmitter in the downhole instrument system 10 (e.g. at the downhole instrument 20 and/or part of the telemetry system 14), the received electrical power data indicating the electrical power that is being drawn by the downhole instrument 20. The load monitor 24 may therefore determine that additional electrical power demands are caused by the failure.

Based on the detected load, the power controller 26 may change one or more parameters (e.g. voltage and/or current) of the electrical power supplied to the downhole instrument system 10 from the electrical power supply 22.

Furthermore, the increase in resistance causes an increase in signal attenuation resulting in an amplitude decrease of sensor data transmitted by the transmitter 30 of the telemetry system 14, e.g. from the downhole instrument 20, via the data transmission medium 32 to the receiver 34 of the telemetry system 14, e.g. at the surface or a repeater. The data from the downhole instrument 20 may therefore by unrecoverable. The telemetry system 14 is configured to recover data from the downhole instrument 20. Specifically, the telemetry system 14 is configured to compensate for the increased single attenuation caused by one or more failure modes, e.g. fluid ingress.

Figure 8:
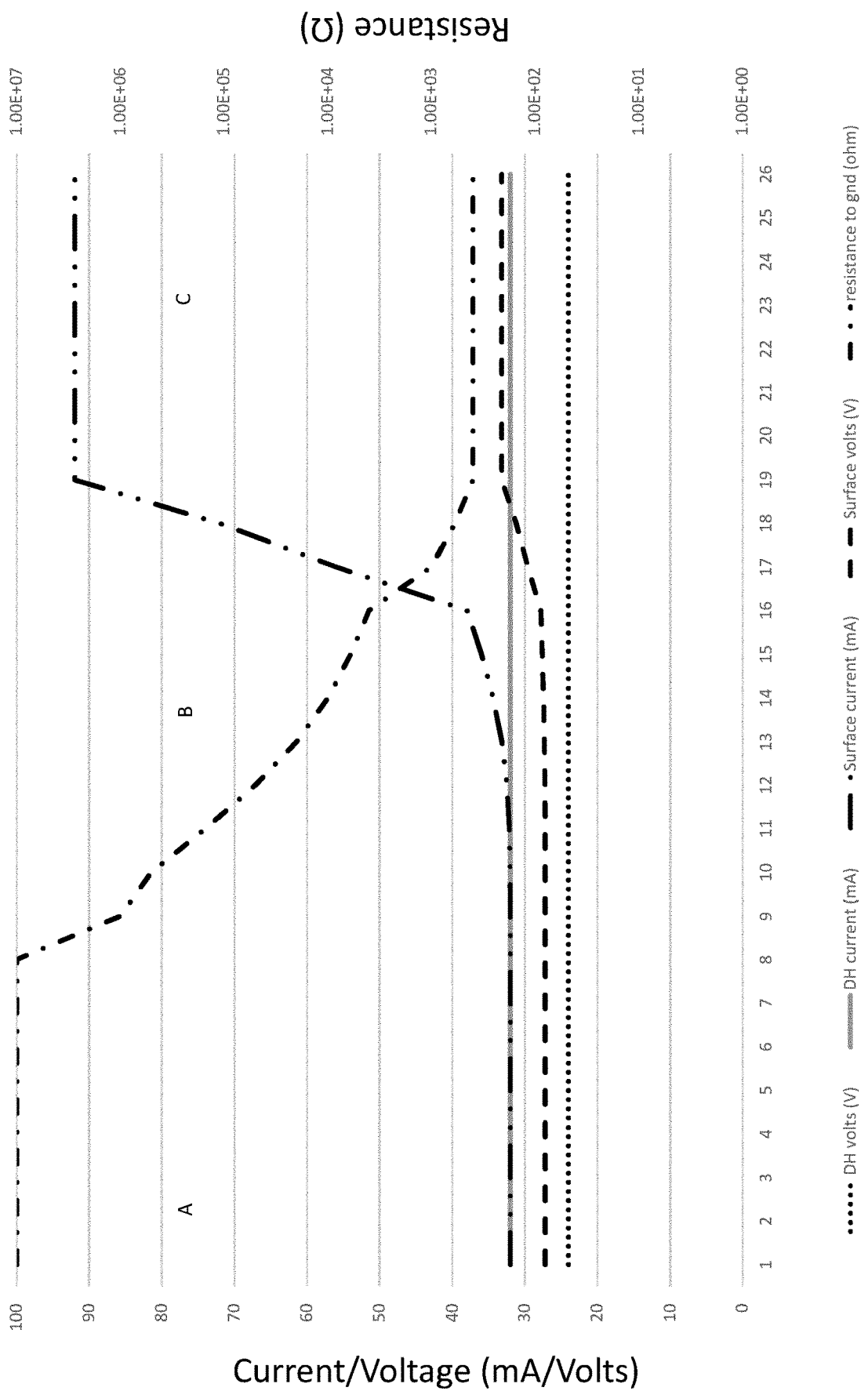
FIG. 8 is a graph of resistance, voltage and current of a simulated downhole instrument system of FIG. 1.

Turning now to FIG. 8, a graph of resistance, voltages and current of a simulated downhole instrument system 10 is shown. The resistance to ground at the power system 12, current at the power system 12, voltage at the power system 12, current at the downhole instrument 20 and the voltage at the downhole instrument 20 are shown. The resistance, voltage and current are depicted through three (3) stages. Stage A when the downhole instrument system 10 is under normal operation and there is no fluid ingress; Stage B when fluid ingress into the downhole system 10 has commenced; and Stage C when fluid ingress into the downhole instrument system 10 has occurred.

In Stage A, the resistance is approximately 100 MΩ, the current is approximately 32 mA and the voltage is 27 V at the power system 12. In Stage A, the current is approximately 32 mA and the voltage is approximately 27 V at the downhole instrument 20. In Stage B, when fluid ingress into the downhole system 10 has commenced, the resistance to ground drops from 100 MΩ (100,000,000Ω) to 400Ω as a result of the new path(s) to ground discussed above. The current increases from 32 mA to 92 mA and the voltage increases from 27 V to 33 V at the power system 12. In Stage B, the current and voltage are constant at 32 mA and 27 V, respectively, at the downhole instrument 20. This indicates that the additional current draw and voltage at the power system 12 are caused by the new path to ground cause by the resistive short circuit. In Stage C, when fluid ingress has occurred, the resistance, current and voltage are constant as 400Ω, 92 mA and 33 V, respectively, at the power system 12. In Stage C, the current and voltage are constant at 32 mA and 27 V, respectively, at the downhole instrument 20.

When the load monitor 24 has detected the change in load, the power controller 26 is able to recover from a significant change in load (e.g. a change in resistance from 100 MΩ (100,000,000Ω) to 400Ω) by increasing the current supplied by the electrical power supply 22 from 32 mA to 92 mA and increasing the voltage from 27 V to 33 V thereby maintaining the current and voltage at the downhole instrument 20 at a constant level. The power system 12 is able to ensure the downhole instrument 20 continues to function despite fluid ingress. The power system 12 is therefore able to adjust power to the downhole instrument 20 such that the downhole instrument 20 maintains an operating state despite fluid ingress.

Figure 9:
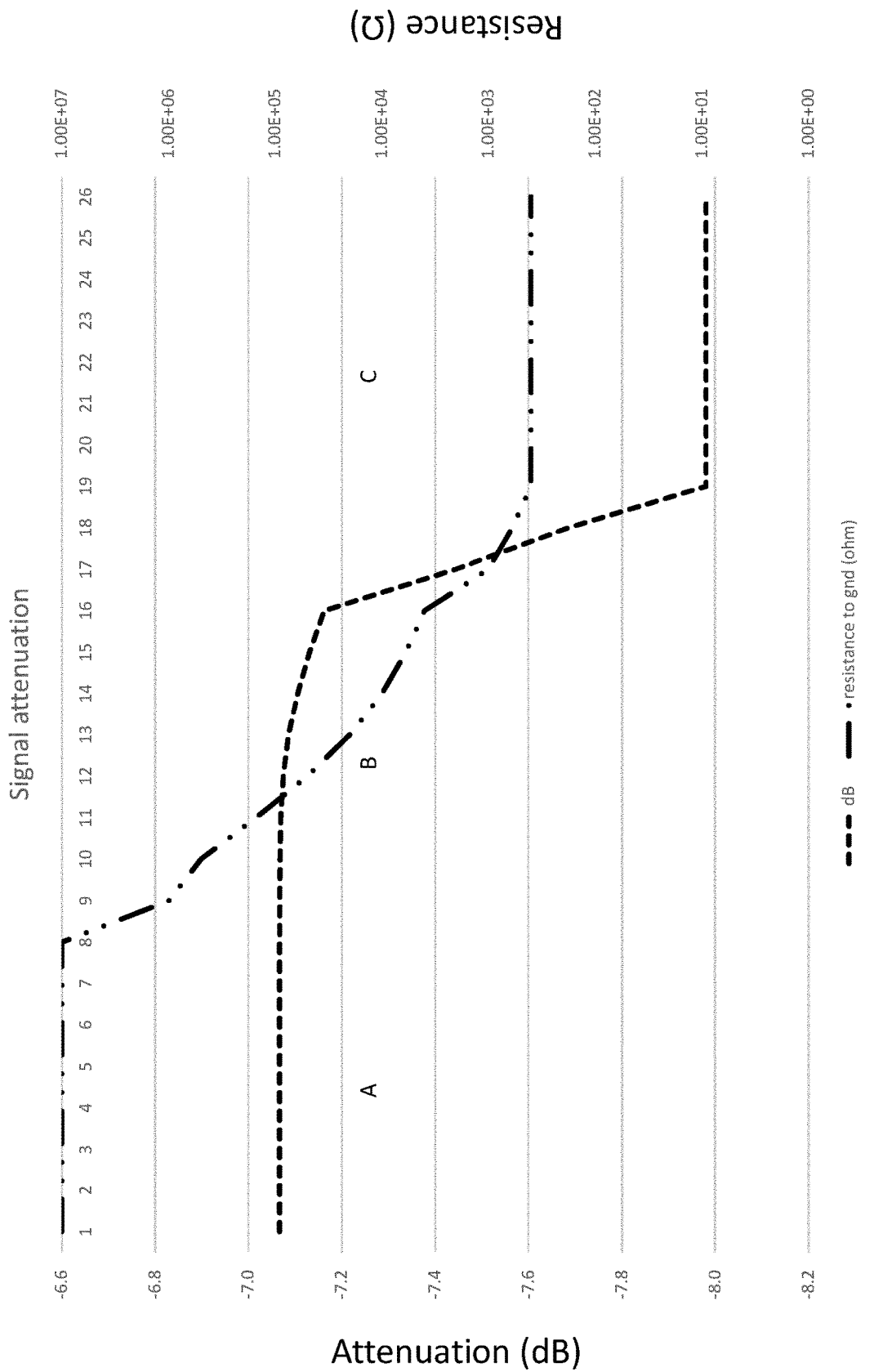
FIG. 9 is a graph of resistance and signal attenuation of a simulated downhole instrument system of FIG. 1.

Turning now to FIG. 9, a graph of resistance and signal attenuation of a simulated downhole instrument system 10 is shown. The resistance to ground in the power system 12 and signal attenuation in dB are shown. As previously stated, the resistance to ground in the power system 12 is a 100 MΩ at Stage A, drops to 400 through Stage B and then stays at 400Ω at Stage C. The same numbers may be used for the data transmission medium 32 in some examples because the data transmission medium 32 comprises, at least in part, the electrical power connection 28. The signal attenuation is approximately −7.05 dB at Stage A in normal operation. When fluid ingress commences at Stage B, the signal attenuation drops to approximately −8.00 dB. At Stage C, when fluid ingress has occurred, the signal attenuation is constant at approximately −8.00 dB. Thus, an increase of approximately 0.95 dB in signal attenuation occurs as a result of fluid ingress.

As previously stated, the telemetry system 14 is configured to recover data from the downhole instrument 20 after fluid ingress. The telemetry system 14 is configured to recover data from the downhole instrument 20 despite the increase of approximately 0.95 dB in signal attenuation. The telemetry system 14 is configured to compensate for the increased signal attenuation caused by, e.g., fluid ingress.

In some embodiments, the transmitter 30 of the telemetry system 14 is configured to adjust amplification of the transmitted sensor data from the downhole instrument 20. In other embodiments, the receiver 34 of the telemetry system 14 may be configured to adjust the gain of the received sensor data. For example, the receiver 34 may be configured to adjust amplification by automatic gain control (AGC). In this embodiment, the AGC is embedded in a digital signal processor (DSP). In another embodiment, the AGC is implemented as discrete analogue gain controlled amplifier stages. Such stages may use a plurality of passive electronic components. In another embodiment, the telemetry system 14 is configured to adjust amplification by employing a DSP with digital filtering and gain control.

In another embodiment, the receiver 34 of the telemetry system 14 may be configured to select the transmitted sensor data from a received signal by analysis in the frequency domain. In this embodiment, the receiver 34 may be configured to apply a Fast Fourier Transform (FFT) (or other frequency domain analysis) to recover data from the transmitted signal from the downhole instrument 20. The receiver 34 may be further configured to filter the received data from the downhole instrument 20. Filtering of the data in the frequency domain provides increased separation of the data from background noise. Furthermore, operating in the frequency domain allows data with higher levels of signal attenuation (as shown in FIG. 9) to be recovered compared to a direct signal pulse decode method.

In another embodiment, the transmitter 30 of the telemetry system 14, which may be in the downhole instrument 20, is configured to compensate for signal attenuation caused by fluid ingress. The downhole instrument 20 is configured to increase data transmission power levels to mitigate increased signal attenuation as shown in FIG. 9. Increasing data transmission power levels ensures sensor data may still be detected despite increased signal attenuation due to fluid ingress.

In another embodiment, the transmitter 30 of the telemetry system 14 may be configured to apply signal encoding to communications with the downhole instrument 20. The receiver 34 may be correspondingly configured. In this embodiment, the transmitter 30 and receiver 34 are configured to communicate via encoded signals. The receiver 34 is able to recover the sensor data signal from the downhole instrument 20 through the introduction of signal encoding. Signal encoding means that the data from the downhole instrument 20 may still be detected despite increased signal attenuation caused by fluid ingress. Signal encoding may include error correcting codes. Exemplary signal encoding includes Hamming codes and low-density parity-check (LDPC) codes.

In another embodiment, the transmitter 30 of the telemetry system 14 may be configured to employ identical repeat data transmissions. The receiver 34 may be correspondingly configured. Identical repeat data transmissions enable the receiver 34 to employ algorithms to be used that determine the likely transmitted data based on the repeat transmission. For example, the receiver 34 may employ 2 out 3 (or M out of N) recovery algorithms to recover noisy data.

While a power system 12 configured to adjust power to the downhole instrument 20 based on load changes caused by fluid ingress, and a telemetry system 14 configured to recover data from the downhole instrument 20 after fluid ingress have been described, the cable termination(s) 18 and/or the downhole instrument 20 may be configured to limit the effect of load changes. In an exemplary embodiment, the cable termination 18 comprises insulation configured to limit the effect of load changes caused by fluid ingress.

Returning to FIG. 6, the cable termination 18 further comprises electrical insulation 64, 66 preventing fluid ingressed into the cable termination 18 from contacting the casing, which is at ground during use, as previously stated. In this embodiment, the insulation 64, 66 takes the form of an insulating coating or lining. By providing electrical insulation to the casing, a surface area of the casing that may be contacted by fluid and that may therefore provide a path to ground from the live conductor 54 is reduced. This has the effect of increasing the resistance 90, 94, mitigating the effect of the short circuit. If the fluid is prevented from contacting the casing completely then the additional path to ground is removed.

In the example of FIG. 6, the insulating coating lines the internal instrument chamber 56 such that the effect of load changes due to fluid ingress are limited. Specifically, the insulating lining at least partially covers the surface of the internal instrument chamber 56. If fluid ingress occurs and the seals 50, 52, 58 and boot 60 fail, fluid may contact one or more of the conductor 54, the instrument housing 42 and the downhole instrument internals 44. However, the insulating coating covering the surface of the internal instrument chamber 42 prevents a low impedance ground from being formed between the live conductor 54 and/or the downhole instrument 20 and the metal surface of the internal instrument chamber 56.

In this embodiment, the insulating coating takes the form of the insulation 64 on the fluid facing surface of the downhole instrument internals 44 and insulation 66 in the internal instrument chamber 56 on the inner surface of the instrument housing 42. The boot 60 provides an insulating layer around the conductor 54. The instrument seal 58 provides a barrier to fluid contact with the internal cable seal 52, cable 16 and instrument housing 42.

The insulation described limits the effect of load changes caused by fluid ingress. Specifically, the insulation prevents a low ohms resistive short to bare metal by insulating the bare metal. Insulating the bare metal prevents a severe load change caused by a low impedance ground to the bare metal. Furthermore, insulating the bare metal seals the instrument chamber 42 preventing any additional load, or increases the impedance of any fault such that the power system 12 and telemetry system 14 can more easily continue to operate.

The limited effect of load changes caused by fluid ingress provided by the insulation reduces the increased current and voltage draw previously described. Thus, the insulation reduces the increased power required by the power system 12. Furthermore, the insulation may result in reduced signal attenuation. Thus, the insulation reduces the amplitude decrease of data from the downhole instrument 20. In this way, the methods and apparatus described herein that relate to the control of electrical power and control of data transmission are improved (and in some cases made possible) because of the insulating coating provided to the casing of the cable termination 18.

A computer program may be configured to provide any of the above described methods. The computer program may be provided on a computer readable medium. The computer program may be a computer program product. The product may comprise a non-transitory computer usable storage medium. The computer program product may have computer-readable program code embodied in the medium configured to perform the method. The computer program product may be configured to cause at least one processor to perform some or all of the method.

Various methods and apparatus are described herein with reference to block diagrams or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

Computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the invention may be embodied in hardware and/or in software (including firmware, resident software, micro-code, etc.) that runs on a processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

Although embodiments have been described above and are shown in the accompanying drawings, it will be appreciated by one of skill in the art that variations and modifications may be made without departing from the scope as defined by the appended claims, and the scope of the claims should be given the broadest interpretation consistent with the specification as a whole.

The invention claimed is:

1. A downhole instrument system for permitting continued operation of a downhole instrument after one or more failure modes, a power system for use in the downhole instrument system, comprising:
    an electrical power supply in electrical communication with the downhole instrument via an electrical power connection comprising one or more lengths of electrical cable and one or more electrical cable terminations;
    a load monitor configured to monitor a load on the electrical power supply, wherein the monitored load is dependent on one or more failure modes related to the electrical power connection; and a power controller configured to control the electrical power supplied to the downhole instrument based on the monitored load;

wherein the load monitor is configured to determine a total load on the electrical power supply and to determine a proportion of the total load that is related to the one or more failure modes; and wherein the load monitor is configured to determine the proportion of the total load based on data relating to one or more of a voltage and a current drawn by the downhole instrument.

2. The downhole instrument system of claim 1, wherein the one or more failure modes comprise fluid ingress to the one or more lengths of electrical cable and/or the one or more electrical cable terminations, such that a path to ground is established via the fluid, wherein the fluid comprises salt water.

3. The downhole instrument system of claim 1, wherein the load monitor and/or the power controller comprises one or more of a voltage regulator and a constant current regulator;

wherein the voltage regulator and/or the constant current regulator comprise a plurality of passive electronic components configured to provide a constant voltage and/or a constant current for a plurality of loads; and wherein the load monitor further comprises a receiver configured to receive from the downhole instrument the data relating to one or more of a voltage and a current drawn by the downhole instrument.

4. The downhole instrument system of claim 1, wherein the one or more lengths of electrical cable comprise a steel encapsulated cable and/or a tubing encased cable.

5. The downhole instrument system of claim 1, wherein the one or more electrical cable terminations comprise:

a casing, at least part of which is arranged to be held at ground potential during use; and first and second exposed electrical conductors housed within the casing, wherein the first exposed electrical conductor is configured to pass electrical power from the one or more lengths of electrical cable to the second exposed electrical conductor when the first and second exposed electrical conductors are in electrical communication; and wherein at least part of the casing comprises an electrically insulating coating for preventing, in the event that fluid that has ingressed the electrical cable termination, the fluid from contacting an area of the casing held at ground potential.

6. The downhole instrument system of claim 5, wherein the electrical cable termination comprises a chamber, in which the first and second exposed electrical conductors are positioned during use, and wherein an inner wall of the chamber is at least partially formed by the at least part of the casing held at ground potential during use, and wherein at least part of the inner wall of the chamber comprises an electrically insulating coating.

7. The downhole instrument system of claim 1, further comprising a telemetry system for transmitting data from the downhole instrument, the telemetry system comprising:

a transmitter configured to transmit sensor data relating to a downhole parameter towards a surface apparatus;

a data transmission medium configured to propagate the transmitted sensor data and comprising one or more lengths of electrical cable and one or more electrical cable terminations; and a receiver configured to receive the transmitted sensor data, wherein one or both of the receiver and the transmitter is configured to control a telemetry parameter relating to receipt and/or transmission of the sensor data based on data indicating a load on the data transmission medium that is dependent on the one or more failure modes related to the data transmission medium; and wherein the data transmission medium comprises at least part of the electrical power connection.

8. The downhole instrument system of claim 7, further comprising a load monitor configured to monitor a load on the data transmission medium, wherein the load monitor is further configured to determine the load on the data transmission medium; and wherein the load monitor is configured to determine a total load of the data transmission medium and to determine a proportion of the total load that is related to the one or more failure modes.

9. The downhole instrument system of claim 7, wherein controlling the telemetry parameter comprises the transmitter controlling one or more of: a transmission power of the transmitted sensor data; a number of times the sensor data is transmitted; a modulation scheme of the transmitted sensor data; and a data transmission rate of the transmitted sensor data.

10. The downhole instrument system of claim 7, wherein controlling the telemetry parameter comprises the receiver controlling one or more of: an amplification of the received sensor data; a determination of the sensor data based on a plurality of received transmissions of the sensor data; selection of the sensor data in a received signal based on frequency analysis; filtering of the received signal prior to selection of the sensor data; and a demodulation scheme of the received sensor data.

11. The downhole instrument system of claim 10, wherein the receiver is configured to use automatic gain control to adjust the amplification.

12. A method for operation of a power system for use in a downhole instrument system and for permitting continued operation of a downhole instrument after one or more failure modes and for supplying electrical power to a downhole instrument, the method comprising:

supplying electrical power in electrical communication with the downhole instrument via an electrical power connection comprising one or more lengths of electrical cable and one or more electrical cable terminations;

monitoring, by a load monitor, a load on an electrical power supply, wherein the monitored load is dependent on one or more failure modes related to the electrical power connection, wherein the electrical power supply is for electrical communication with the downhole instrument via the electrical power connection; and controlling, by a power controller, the electrical power supplied to the downhole instrument based on the monitored load;

wherein the load monitor is configured to determine a total load on the electrical power supply and to determine a proportion of the total load that is related to the one or more failure modes; and wherein the load monitor is configured to determine the proportion of the total load based on data relating to one or more of a voltage and a current drawn by the downhole instrument.

13. A non-transitory computer readable medium having computer readable code stored thereon, the computer readable code when executed by a processor configured to perform the method of claim 12.

\* \* \* \* \*